(12) United States Patent
Strand (10) Patent No.: US 7,727,384 B2
(45) Date of Patent: Jun. 1, 2010

(54) BITUMEN RECOVERY PROCESS FOR OIL SAND

(75) Inventor: William L. Strand, Edmonton (CA)

(73) Assignee: Bitmin Resources, Inc., Calgary (CA)

( * ) Notice: Subject to any disclaimer, the term of this patent is extended or adjusted under 35 U.S.C. 154(b) by 1163 days.

(21) Appl. No.: 11/257,790

(22) Filed: Oct. 25, 2005

(65) Prior Publication Data

US 2007/0090025 A1 Apr. 26, 2007

(30) Foreign Application Priority Data

Oct. 21, 2005 (CA) .................................. 2524110

(51) Int. Cl.
 *C10G 1/04* (2006.01)
(52) U.S. Cl. .................. 208/390; 208/391; 209/164; 209/171
(58) Field of Classification Search .................. 208/390, 208/391; 209/162, 164, 165, 171; 210/703
See application file for complete search history.

(56) References Cited

U.S. PATENT DOCUMENTS

| | | | |
|---|---|---|---|
| 3,331,765 A | 7/1967 | Canevari et al. | |
| 3,594,306 A | 7/1971 | Dobson | |
| 3,869,384 A | 3/1975 | Schutte | |
| 3,893,907 A | 7/1975 | Canevari | |
| 3,904,520 A | 9/1975 | Dancy | |
| 4,098,648 A | 7/1978 | Kraemer et al. | |
| 4,160,718 A | 7/1979 | Rendall | |
| 4,172,025 A | 10/1979 | Porteous et al. | |
| 4,225,433 A | 9/1980 | Liu et al. | |
| 4,236,995 A | 12/1980 | Kruyer | |
| 4,240,897 A | 12/1980 | Clarke | |
| 4,250,016 A | 2/1981 | Estes et al. | |
| 4,324,652 A | 4/1982 | Hack | |
| 4,330,409 A | 5/1982 | Yong et al. | |

(Continued)

FOREIGN PATENT DOCUMENTS

CA 645043 7/1962

(Continued)

OTHER PUBLICATIONS

A. Corti and M. Dente, "Athabasca Mineable Oil Sands: The RTR/Gulf Extraction Process," Paper No. 81, 4th UNITAR/UNDP Conference on Heavy Crude and Tar Sands, 6pp.

(Continued)

*Primary Examiner*—Walter D Griffin
*Assistant Examiner*—Renee Robinson
(74) *Attorney, Agent, or Firm*—Terrence N. Kuharchuk; Rodman & Rodman (57) ABSTRACT

A bitumen recovery process is provided which includes the step of providing a bitumen froth or a component derived from the bitumen froth as a feed material, wherein the bitumen froth is produced in a primary separation process from a slurry comprising oil sand and water. Further, the process includes the step of subjecting the feed material to froth flotation in a column flotation cell in order to recover a bitumen product from the feed material. Preferably, the froth flotation cell includes an underwash zone, wherein a bitumen-rich fraction of the feed material is passed through the underwash zone as the bitumen-rich fraction rises within the column flotation cell.

20 Claims, 2 Drawing Sheets

U.S. PATENT DOCUMENTS

| | | | |
|---|---|---|---|
| 4,331,532 A | 5/1982 | Bose | |
| 4,399,039 A | 8/1983 | Yong | |
| 4,406,788 A | 9/1983 | Meadus et al. | |
| 4,414,117 A | 11/1983 | Yong et al. | |
| 4,425,227 A | 1/1984 | Smith | |
| 4,456,533 A | 6/1984 | Seitzer | |
| 4,459,200 A | 7/1984 | Dente et al. | |
| 4,470,899 A | 9/1984 | Miller et al. | |
| 4,512,956 A | 4/1985 | Robinson et al. | |
| 4,533,459 A | 8/1985 | Dente et al. | |
| 4,561,965 A | 12/1985 | Minkkinen | |
| 4,648,964 A | 3/1987 | Leto et al. | |
| 4,678,558 A | 7/1987 | Belluteau et al. | |
| 4,702,487 A | 10/1987 | Stoian et al. | |
| 4,804,460 A * | 2/1989 | Moys et al. | 209/164 |
| 4,828,688 A | 5/1989 | Corti et al. | |
| 4,946,597 A | 8/1990 | Sury | |
| 4,966,687 A * | 10/1990 | Trigg | 209/164 |
| 5,290,433 A | 3/1994 | Chan et al. | |
| 5,307,937 A | 5/1994 | Hutwelker | |
| 5,332,100 A | 7/1994 | Jameson | |
| 5,645,714 A | 7/1997 | Strand et al. | |
| 5,723,042 A | 3/1998 | Strand et al. | |
| 5,762,781 A * | 6/1998 | Bodnaras | 209/170 |

FOREIGN PATENT DOCUMENTS

| | | |
|---|---|---|
| CA | 793288 | 8/1968 |
| CA | 793812 | 9/1968 |
| CA | 892547 | 2/1972 |
| CA | 1021709 | 11/1977 |
| CA | 1085761 | 9/1980 |
| CA | 1165712 | 4/1984 |
| CA | 1167238 | 5/1984 |
| CA | 1174627 | 9/1984 |
| CA | 2015784 | 10/1991 |
| CA | 2030934 | 5/1992 |
| CA | 2124199 | 6/1992 |
| CA | 2088320 | 7/1993 |
| CA | 2123076 | 11/1995 |
| DE | 360977 | 10/1922 |
| DE | 26 11 251 | 10/1976 |
| DE | 38 15 309 | 11/1988 |
| WO | WO 92/09672 | 6/1992 |

OTHER PUBLICATIONS

RTR-Gulf, "Oil Sands Extraction," Process Evaluation, 1982, vol. 1, Executive Summary (20 pages).

Sheeran, D., Sethi, A. and Smith, P., "An Integrated Approach to Environmentally Acceptable Disposal of Athabasca Oilsand Fine Tailings," Joint CSCE-ASCE Ntl. Conf., 1993, 8 pp.

Scott, J.D. and Cymerman, G.J., "Prediction of Viable Tailings Disposal Methods," Proc. of Symposium:Sedimentation Consolidation Models, ASCE, 1984, San Francisco, pp. 522-544.

Somasundaran, P., "Principles of Flocculation, Dispersion and Selective Flocculation," Proc. of Intl. Symp. on Fine Particles Processing, Las Vegas, Nev., 1980, pp. 947-976.

The NALCO Water Handbook, Kemmer, Frank, N., Ed., McGraw-Hill Book Company, 1979, pp. 4-7-4-10.

Dusseault, M.B. and Ash, P.O., "Strength Development in Oil Sands Sludge/Clay Shale Mixes for Tailings Disposal," UF/FIPR Symp. May 1987, Lakeland, FL (17 pages).

Stevens, G.S., Rendall, E.O., Livingstone, W.R., "The Oslo Commercial Extraction Process . . . ," CIM/AOSTRA 1991 Tech. Conf., Banff, AB, pp. 96-1 to 96-8.

Column Flotation Cell Operating and Maintenance Manual, Canadian Process Technologies Inc., Oct. 2001 (52 pages).

Cruz, E.B., Dissertation entitled "A Comprehensive Dynamic Model of the Column Flotation Unit Operation", Jul. 31, 1997, Ch. 5, pp. 178-185 (9 pages).

McKeon, Timothy J., Abstract for "An In-Plant Evaluation of Froth Washing on Conventional Flotation Cells for Coal", Master's Thesis, Nov. 12, 2001, from www.scholar.lib.vt.edu (2 pages).

"Column Cells for Mineral Flotation," Canadian Process Technologies, 2005, from www.cpti.bc.ca (1 page).

"CoalPro," Canadian Process Technologies, 2005, from www.cpti.bc.ca (1 page).

"VOSCell," Canadian Process Technologies, 2005, from www.cpti.bc.ca (2 pages).

Brochure including company information for "Canadian Process Technologies Inc.", undated (15 pages).

Valenti, Michael, "Oil sand kicks into high gear," American Society of Mechanical Engineers, 1998, from www.memagazine.org (10 pages).

"Column Flotation in an Oilsand Application," Abstract, CIM Technical Paper Library, 2004, from www. cim.org (1 page).

"Separation by flotation", Metso Minerals, 2004 from www.metsominerals.com (4 pages).

* cited by examiner

BITUMEN RECOVERY PROCESS FOR OIL SAND

FIELD OF INVENTION

The present invention relates to a bitumen recovery process. Further, the present invention recovers a bitumen product from a feed material comprised of a bitumen froth produced in a primary separation process from a slurry comprising oil sand and water.

BACKGROUND OF INVENTION

Oil sand is essentially a matrix of bitumen, mineral matter and water. The bitumen component of oil sand consists of viscous hydrocarbons which behave much like a solid at normal in situ temperatures and which act as a binder for the other components of the oil sand matrix. The mineral matter component of oil sand typically consists largely of sand, but may also include rock, silt and clay. Sand and rock are considered to be coarse mineral matter, while clay and silt are considered to be fine mineral matter, where fines are defined as mineral matter having a particular size of less than 44 microns. The water component of oil sand consists essentially of a film of connate water surrounding the sand in the oil sand matrix, and may also contain particles of fine mineral matter within it.

A typical deposit of oil sand will contain about 10% to 12% bitumen and about 3% to 6% water, with the remainder of the oil sand being made up of solid mineral matter particles. Typically the mineral matter component in oil sand will contain about 14% to 20% fines, measured by weight of total mineral matter contained in the deposit, but the amount of fines may increase to about 30% or more for poorer quality deposits. Oil sand extracted from the Athabasca area near Fort McMurray, Alberta, Canada, averages about 11% bitumen, 5% water and 84% mineral matter, with about 15% to 20% of the mineral matter being made up of fines.

Oil sand deposits are mined for the purpose of extracting bitumen from the oil sand, which bitumen is then upgraded to synthetic crude oil. Accordingly, various processes have been developed for extracting the bitumen from the oil sand.

For instance, conventionally, a "hot water process" is used for extracting bitumen from oil sand in which both aggressive thermal action and aggressive mechanical action are used to liberate and separate bitumen from the oil sand. The hot water process is a three step process. First, the oil sand is conditioned by mixing it with hot water at about 95° Celsius and steam in a conditioning vessel which vigorously agitates the resulting slurry in order to completely disintegrate the oil sand. Second, once the disintegration is complete, the slurry undergoes a primary separation process. The primary separation process separates the slurry by allowing the sand and rock to settle out, and the bitumen, having air entrained within it, floats to the top of the slurry and is withdrawn as a bitumen froth. Third, the remainder of the slurry, which is referred to as the middlings, is then treated further or scavenged by froth flotation techniques to recover bitumen that did not float to the top of the slurry during the primary separation process. In this case, the bitumen recovered from the middlings may be returned to the primary separation process to form or comprise a portion of the bitumen froth.

Various attempts have been made to improve upon the hot water process, such as: Canadian Patent No. 1,085,761 issued on Sep. 16, 1980 to Rendall; U.S. Pat. No. 4,512,956 issued on Apr. 23, 1985 to Robinson et al; U.S. Pat. No. 4,533,459 issued on Aug. 6, 1985 to Dente et al; U.S. Pat. No. 4,414,117 issued on Nov. 8, 1983 to Yong et al; and U.S. Pat. No. 4,225,433 issued Sep. 30, 1980 to Liu et al.

Further, Canadian Patent Application No. 2,030,934 published on May 28, 1992 by Strand and Canadian Patent Application No. 2,124,199 published on Jun. 11, 1992 by Strand, both describe an extraction apparatus and process employing a countercurrent separator vessel in which oil sand is gently rolled from one end to the other by a spiral ribbon and mixer elements while hot water, defined as having a temperature of about 50° Celsius, circulates in the opposite direction. Two streams are then removed from opposite ends of the separator vessel. One stream contains coarse mineral matter and some water, while the other stream contains a bitumen froth comprised of bitumen and dispersed fine mineral matter.

As well, Canadian Patent No. 2,123,076 issued Nov. 17, 1998 to Strand et. al. utilizes the countercurrent separator vessel of the previously noted Canadian Patent Applications in the performance of an improved oil sand extraction process. Specifically, Strand et. al. describes an overall method for processing lumps of oil sand containing bitumen to produce a bitumen product and non segregating tailings of a solid material and a sludge. The method includes depositing the lumps of oil sand into a bath of warm water. The lumps are then conditioned by gently contacting them with the warm water to liberate and separate bitumen from the oil sand while minimizing the dispersal into the bath of fine material contained in the oil sand. The conditioning step is preferably performed utilizing the previously described countercurrent separator vessel.

Following conditioning, the solid material remaining after the liberation and separation of the bitumen from the oil sand is removed from the bath and collected for further processing. The bitumen froth, comprised of the warm water containing bitumen and dispersed fine material, is also removed from the bath and collected for further processing.

In each of the previously described bitumen recovery processes, a primary separation process, being the first or initial separation process, is performed on a slurry comprised of oil sand and water in order to separate an amount of the coarse mineral matter from the bitumen and dispersed fine mineral matter in the oil sand. Thus, as indicated, this primary separation process produces a bitumen froth comprised of bitumen, water and dispersed fine mineral matter.

Further, in each of the described processes, in order to produce a desired bitumen product from the bitumen froth, the bitumen froth is typically subjected to further processing. In particular, the bitumen froth typically undergoes one or more further or subsequent separation processes in order to further separate the bitumen in the bitumen froth from the fine mineral matter.

For instance, referring to Canadian Patent No. 2,123,076 to Strand et. al., the bitumen froth produced by the primary separation process is subsequently conducted through a number of further separation vessels in sequence. First, the bitumen froth is conducted to a conventional gravity froth separator. Specifically, the bitumen is sufficiently aerated by gas inclusions or entrained air as it leaves the primary separation vessel to float to the top of the froth separator, where it may be removed and collected. The underflow from the froth separator is then conducted to a conventional froth flotation cell. The conventional froth flotation cell aerates and mechanically agitates the underflow from the froth separator. Then, the overflow from the conventional froth flotation cell is conducted to a further conventional gravity froth separator, as described previously.

The amount of bitumen separated within a conventional gravity froth separator is largely dependent upon the degree of aeration of the bitumen entering the separator. Further, although a conventional froth flotation cell aerates the bitumen within the bitumen froth, the separation process also requires the mechanical agitation of the bitumen froth. The need to mechanically agitate the bitumen froth may render the process less energy efficient and require more maintenance of the moving parts, as compared to other separation vessels.

Thus, there is a need for an improved bitumen recovery process, and specifically, for an improved process for recovering a bitumen product from a bitumen froth produced in a primary separation process from a slurry comprising oil sand and water. Preferably, the process is relatively energy and cost efficient and produces a bitumen product having desirable characteristics or qualities, as compared with known bitumen recovery processes.

SUMMARY OF INVENTION

The present invention relates to a process for recovering bitumen from oil sand. More particularly, the present invention preferably relates to a process for recovering a bitumen product from a feed material comprised of a bitumen froth or a component derived from the bitumen froth, wherein the bitumen froth is produced from a slurry comprising oil sand and water. Although the bitumen froth may be produced from the slurry in any manner or by any process capable of so producing the bitumen froth, the bitumen froth is preferably produced in a primary separation process. Further, the process is preferably comprised of subjecting the feed material to froth flotation in a column flotation cell.

Thus, in one aspect of the invention, the invention is directed at a bitumen recovery process comprising the following steps:

(a) providing a bitumen froth or a component derived from the bitumen froth as a feed material, wherein the bitumen froth is produced in a primary separation process from a slurry comprising oil sand and water; and (b) subjecting the feed material to froth flotation in a column flotation cell in order to recover a bitumen product from the feed material.

As discussed above, oil sand is comprised of a matrix of bitumen, solid particles and water. The bitumen is comprised of heavy oil or viscous hydrocarbons which typically behave much like a solid at normal in situ temperatures and which act as a binder for the other components of the oil sand matrix. The solid particles are comprised of mineral matter including sand, rock, silt and clay. Sand and rock are considered to be coarse mineral matter, while clay and silt are considered to be fine mineral matter, where fines are defined as mineral matter having a particular size of less than 44 microns. The water is typically comprised of a film of connate water surrounding the sand in the oil sand matrix, and may also include particles of fine mineral matter.

The bitumen froth is produced from a slurry comprising the oil sand and water. Specifically, the slurry is comprised of particles of oil sand suspended within the water to facilitate the transportation and processing of the oil sand. The oil sand comprising the slurry may be subjected to thermal and/or mechanical action in order to disintegrate or break apart the oil sand to produce a desired oil sand particle size. The slurry is then subjected to any suitable process for the production of the bitumen froth therefrom, wherein the bitumen froth is comprised of bitumen, water and an amount of fines or fine mineral matter.

The bitumen froth may be produced by any suitable bitumen recovery process. However, preferably, the bitumen froth is produced by a separation process, wherein the components of the slurry, including the components of the oil sand, are separated to provide the bitumen froth. More preferably, the bitumen froth is produced by a primary separation process. The primary separation process refers to the chief or principal separation process first or initially conducted on the slurry or to which the slurry is exposed which produces a bitumen froth comprised of bitumen, but which also includes an amount of water and which typically includes an amount of fine mineral matter which is not readily separated from the bitumen during the processing of the oil sand.

Thus, in the preferred embodiment, the primary separation process produces a bitumen froth, which may also be referred to as the liquid stream of the process. In addition, the primary separation process typically produces a solid stream containing solid particles including both coarse and fine mineral matter and some water. The primary separation process may be performed by any conventional separator or separation vessel capable of producing the desired liquid and solid streams. Preferably, the primary separation process is a countercurrent separation process producing the liquid stream and the solid stream. The countercurrent separation process may be performed in any suitable countercurrent separator or separation vessel, such as that described in Canadian Patent No. 2,123,076.

Alternatively, the primary separation process may be comprised of the hot water process described previously, producing a liquid stream, a solid stream and a middlings stream. As discussed above, the middlings stream may be further processed such that any bitumen contained therein is recycled to the primary separation vessel to form a part of the liquid stream.

The process includes the step of providing the bitumen froth or a component derived from the bitumen froth as a feed material, which is then subjected to froth flotation in a column flotation cell. Thus, the bitumen froth produced by the primary separation process from the slurry may be directly provided as the feed material. However, alternately, the bitumen froth may require some amount of further processing prior to being utilized or provided as the feed material. In this case, the bitumen froth produced by the primary separation process from the slurry is indirectly provided as the feed material. In other words, the component derived from the bitumen froth may be a downstream constituent or product produced or obtained from the bitumen froth and comprising an amount of bitumen. For example, the bitumen froth produced by the primary separation process may be further processed, if necessary, to provide a froth have qualities or characteristics either more desirable or more suitable for subjecting to froth flotation.

In the preferred embodiment, the feed material consists essentially of the bitumen froth. In other words, as described above, the bitumen froth produced by the primary separation process from the slurry is directly provided as the feed material, without any intermediate or intervening processing.

Next, the process is comprised of the step of subjecting the feed material to froth flotation in a column flotation cell in order to recover a bitumen product from the feed material. Thus, the bitumen product is comprised of an amount of bitumen. More particularly, the bitumen product is comprised of a bitumen-rich fraction of the feed material. Thus, the bitumen product has a percentage by weight of bitumen greater than the percentage by weight of bitumen in the feed material. Accordingly, the percentage by weight of bitumen in the bitumen product is dependent, at least in part, upon the percentage by weight of bitumen in the feed material from the primary separation process. Preferably, the bitumen product has a concentration by weight of between about 10 percent and 65 percent bitumen.

Froth flotation involves the separation of the bitumen in the feed material as a result of gas aeration or entrained air in the bitumen, causing the bitumen to float to the top of, or move upwardly within, the froth flotation cell. In the present invention, the step of subjecting the feed material to froth flotation is performed in a column flotation cell. The column flotation cell aerates the feed material without mechanically agitating the feed material. Rather, any disturbance of the feed material within the column flotation cell is primarily a result of the aeration of the feed material.

Unlike conventional froth flotation cells, column flotation cells do not use mechanical agitation. The absence of intense agitation is believed to promote selectivity and aid in the recovery of the bitumen. Generally speaking, in a column flotation cell, the feed material enters the column at least one location, typically located in the upper third of a body of the column flotation cell. The feed material descends or travels downwardly through a bitumen collection zone or area towards a lower end of the column flotation cell. Concurrently, a swarm or mass of gas bubbles are generated which ascend or travel upwardly through the bitumen collection zone or area towards an upper end of the column flotation cell.

Thus, within the bitumen collection zone, bitumen particles moving downwardly with the feed material collide with and attach to the gas bubbles travelling upwardly. Accordingly, a bitumen-rich fraction of the feed material is separated from the remainder of the feed material and moved upwardly with the gas bubbles, eventually reaching the upper end of the column flotation cell to form a froth zone or layer.

The feed material may be subjected to froth flotation in any compatible conventional or known column flotation cell. Preferably, the column flotation cell is comprised of a feed inlet for introducing the feed material into the column flotation cell, an aeration bubble inlet for introducing a supply of gas bubbles into the column flotation cell, an underflow outlet for removing an underflow stream from the column flotation cell, and an overflow outlet for removing the bitumen product from the column flotation cell.

Further, the column flotation cell may have any dimensions or configuration suitable for performing the froth flotation to recover the bitumen product from the feed material. As well, each of the feed inlet and the aeration bubble inlet may communicate or be associated with the column flotation cell at one or more positions or locations within the column flotation cell which permit the inlet to perform its respective intended function. Similarly, each of the overflow outlet and the underflow outlet may communicate with the column flotation cell or be associated with the column flotation cell at any position or location within the column flotation cell permitting the outlet to perform its respective intended function.

However, preferably, the column flotation cell is comprised of an upper end and a lower end, wherein the underflow outlet is located adjacent to the lower end of the column flotation cell, wherein the overflow outlet is located adjacent to the upper end of the column flotation cell, wherein the aeration bubble inlet is located between the underflow outlet and the overflow outlet, and wherein the feed inlet is located between the aeration bubble inlet and the overflow outlet.

The feed inlet may be comprised of any suitable conduit, pipe or conveyance device capable of conveying or transporting the feed material for introduction into the column flotation cell. Preferably, the feed inlet is comprised of at least one conduit in fluid communication with the column flotation cell. In addition, the portion or end of the conduit provided within the column flotation cell for introducing the feed material preferably includes a distributor head or distribution device for distributing, dispersing or scattering the feed material within the column flotation cell in a desired manner to enhance or facilitate the contact of the feed material with the gas bubbles and thus, the collection of the bitumen-rich fraction.

Preferably, the feed inlet is in fluid communication with the column flotation cell such that the feed material may pass within the column flotation cell at one or more desired points or locations. In particular, the conduit comprising the feed inlet preferably communicates with the column flotation cell between the aeration bubble inlet and the overflow outlet. Further, in the preferred embodiment, the feed inlet defines the uppermost end of the bitumen collection zone within the column flotation cell.

The aeration bubble inlet may similarly be comprised of any suitable conduit, pipe or conveyance device or system capable of conveying or transporting a supply of gas bubbles for introduction into the column flotation cell. Preferably, the aeration bubble inlet is associated with or comprised of a conventional or known gas sparging system or gas injection system. The bubbles may be comprised of any gas compatible for use with the feed material and suitable for attaching with the bitumen-rich fraction therein. Preferably, the gas is air such that a supply of air bubbles are introduced through the aeration bubble inlet.

Further, in the preferred embodiment, the aeration bubble inlet is preferably comprised of at least one sparger, also known as a sparger tube or air lance, or a conduit defining a plurality of holes therein for passage of the gas bubbles out of the conduit into the column flotation cell. More preferably, the aeration bubble inlet is comprised of a plurality of spargers or porous conduits distributed within the column flotation cell in a desired manner or pattern for dispersing or scattering the gas bubbles within the column flotation cell to enhance or facilitate the contact of the gas bubbles with the feed material and thus, the collection of the bitumen-rich fraction.

Preferably, the aeration bubble inlet is in fluid communication with the column flotation cell such that the supply of gas bubbles may be introduced into the column flotation cell at a desired point or location. In particular, the sparger or spargers comprising the aeration bubble inlet preferably communicate with the column flotation cell between the underflow outlet and the overflow outlet. In the preferred embodiment, the aeration bubble inlet defines the lowermost end of the bitumen collection zone within the column flotation cell. Thus, in order to maximize the bitumen collection zone, the aeration bubble inlet is preferably located in proximity to or adjacent the underflow outlet, while the feed inlet is spaced a desired distance from the aeration bubble inlet to provide the desired size, volume or dimensions of the bitumen collection zone.

The volumetric capacity of the column flotation cell, including the volumetric capacity of the bitumen collection zone, as well as the feed rate of both the feed material from the feed inlet and the gas bubbles from the aeration bubble inlet, are selected depending upon, amongst other factors, the composition of the feed material, the desired composition of the bitumen product including the bitumen-rich fraction and the desired residence time of the feed material in the bitumen collection zone. Further, the feed rates of the feed material and the supply of gas bubbles are related. For instance, the aeration bubble inlet rate will be selected in accordance with the feed rate of the feed material to achieve the desired bitumen product.

The underflow outlet may be comprised of any suitable conduit, pipe or device capable of collecting and discharging, expelling or removing the underflow stream from the column flotation cell. Further, the underflow outlet is in fluid communication with the column flotation cell such that the underflow stream may pass out of, or be removed from, the column flotation cell at one or more desired points or locations. Preferably, to facilitate the removal of the underflow stream, the underflow outlet is preferably located at, in proximity to or otherwise adjacent to the lower end of the column flotation cell. Thus, the underflow outlet is preferably positioned beneath or below the bitumen collection zone.

In the preferred embodiment, the lower end of the column flotation cell defines an underflow discharge opening which is sized and proportioned to permit the underflow stream to be removed therethrough at the desired removal rate. Further, the underflow discharge opening is preferably comprised of an underflow launder or collector connected with a pipe or conduit suitable for transporting or conveying the underflow stream away from the column flotation cell. The removal rate of the underflow stream is selected depending upon, amongst other factors, the feed rate of the feed material into the column flotation cell, the desired residence time of the feed material therein and the desired fluid level in the column flotation cell.

The overflow outlet may similarly be comprised of any suitable conduit, pipe or device capable of collecting and discharging, expelling or removing the overflow stream comprised of the bitumen product from the column flotation cell. Further, the overflow outlet is in fluid communication with the column flotation cell such that the bitumen product may pass out of, or be removed from, the column flotation cell at one or more desired points or locations.

As discussed above, a bitumen-rich fraction of the feed material attaches to the gas bubbles and moves towards the upper end of the column flotation cell with the gas bubbles to form a froth zone or layer at the upper end of the column flotation cell. The bitumen-rich fraction is then removed through the overflow outlet as the bitumen product. In order to facilitate the removal of the bitumen product, the overflow outlet is preferably located at, in proximity to or otherwise adjacent to the upper end of the column flotation cell. Further, the overflow outlet preferably communicates or is otherwise associated with the froth zone of the column flotation cell.

In the preferred embodiment, the upper end of the column flotation cell defines an overflow discharge opening which is sized and proportioned to permit the overflow stream comprising the bitumen product to be removed therethrough at the desired removal rate. Further, the overflow discharge opening is preferably comprised of an overflow launder or collector connected with a pipe or conduit suitable for transporting or conveying the bitumen product away from the column flotation cell. The removal rate of the bitumen product is selected depending upon, amongst other factors, the desired volume of the froth zone in the column flotation cell.

Further, the step of subjecting the feed material to froth flotation in the column flotation cell is preferably comprised of the following steps:

(i) introducing the feed material into the column flotation cell at the feed inlet;

(ii) introducing the supply of gas bubbles into the column flotation cell at the aeration bubble inlet so that the gas bubbles rise in the column flotation cell toward the overflow outlet;

(iii) contacting the feed material with the supply of gas bubbles as the gas bubbles rise in the column flotation cell so that a bitumen-rich fraction of the feed material is assisted in rising in the column flotation cell toward the overflow outlet;

(iv) removing the bitumen-rich fraction of the feed material from the column flotation cell at the overflow outlet as the bitumen product; and (v) removing the underflow stream from the column flotation cell at the underflow outlet.

In the preferred embodiment, the step of subjecting the feed material to froth flotation in the column flotation cell is further comprised of the following step:

(vi) passing the bitumen-rich fraction of the feed material through an underwash zone of the column flotation cell located between the feed inlet and the overflow outlet of the column flotation cell as the bitumen-rich fraction rises toward the overflow outlet.

An underwash zone is preferably provided for cleaning the bitumen-rich fraction of the feed material prior to its entering the froth zone for removal as the bitumen product. Cleaning of the bitumen-rich fraction refers to the further separation of undesirable materials entrained in the fraction, such as fine mineral matter or other solids, from the desirable bitumen content. Thus, the underwash zone provides an additional process or mechanism by which unwanted impurities may be filtered or removed from the feed material. In addition, the underwash zone may facilitate the stabilization of the bitumen-rich fraction passing into the froth zone.

The underwash zone is preferably located between the feed inlet and the overflow outlet of the column flotation cell. Thus, in the preferred embodiment, the underwash zone is positioned between the bitumen collection zone and the froth zone. Accordingly, as the bitumen-rich fraction rises within the column flotation cell, it passes upwardly out of the bitumen collection zone and through the underwash zone for collection in the froth zone.

The underwash zone may be comprised of any fluid capable of facilitating or assisting the further separation or cleaning of the bitumen-rich fraction as it passes through the underwash zone. However, preferably, the underwash zone is comprised of a layer of an underwash water contained in the column flotation cell. The underwash water itself is preferably relatively clean or free of impurities or extraneous matter. As the underwash water facilitates the further separation of the bitumen-rich fraction, any fine mineral matter or solids detached from the gas bubbles and bitumen first drop back or fall within the underwash zone back towards the bitumen collection zone and subsequently drop back or fall within the bitumen collection zone towards the underflow outlet for removal as part of the underflow stream. Meanwhile, the remainder of the "cleaned" bitumen-rich fraction rises within the underwash zone towards the froth zone and the overflow outlet for removal as the bitumen product.

Further, the layer of the underwash water preferably has a temperature greater than the temperature of the feed material in the bitumen collection zone. The increased temperature is believed to further facilitate the separation of any fine mineral matter or solids from the bitumen by the layer of underwash water as the bitumen-rich fraction passes through the underwash zone. In the preferred embodiment, the layer of the underwash water contained in the column flotation cell has a temperature of between about 40 degrees Celsius and about 75 degrees Celsius. More preferably, the layer of the underwash water has a temperature of between about 60 degrees Celsius and about 70 degrees Celsius.

Finally, the step of subjecting the feed material to froth flotation in the column flotation cell is also preferably further comprised of the following step:

(vii) introducing the underwash water into the column flotation cell at an underwash inlet in the column flotation cell located between the feed inlet and the overflow outlet.

As discussed above, the layer of the underwash water preferably has a temperature greater than the temperature of the feed material in the bitumen collection zone. Thus, in the preferred embodiment, the underwash water which is introduced into the column flotation cell has a temperature of between about 40 degrees Celsius and about 75 degrees Celsius. More preferably, the underwash water which is introduced into the column flotation cell has a temperature of between about 60 degrees Celsius and about 70 degrees Celsius.

As well, in order to facilitate the further separation of the bitumen-rich fraction within the underwash zone by the underwash water, any turbulence or agitation within the underwash zone is preferably minimized. Accordingly, in the preferred embodiment, the underwash water is introduced into the column flotation cell under substantially laminar flow conditions in order to minimize turbulence in the column flotation cell.

The underwash inlet may be comprised of any suitable conduit, pipe or conveyance device capable of conveying or transporting the underwash water for introduction into the column flotation cell. Preferably, the underwash inlet is comprised of at least one conduit in fluid communication with the column flotation cell. In addition, the portion or end of the conduit provided within the column flotation cell for introducing the underwash water preferably includes a distributor head or distribution device for distributing or dispersing the underwash water within the column flotation cell under substantially laminar flow conditions.

Preferably, the underwash inlet is in fluid communication with the column flotation cell between the feed inlet and the overflow outlet. Thus, the conduit comprising the underwash inlet communicates with the column flotation cell such that the underwash water may pass within the column flotation cell to provide the layer of underwash water comprising the underwash zone.

In addition, the bitumen recovery process of the present invention is preferably further comprised of the steps, following the step of subjecting the feed material to froth flotation in the column flotation cell, of:

(c) providing the underflow stream from the column flotation cell as a secondary feed material; and (d) subjecting the secondary feed material to secondary froth flotation in order to recover a secondary bitumen product from the secondary feed material.

The process includes the step of providing the underflow stream as the secondary feed material, which is then subjected to secondary froth flotation. The underflow stream from the column flotation cell may be directly or indirectly provided as the secondary feed material. In other words, the underflow stream may be directly provided as and comprise the secondary feed material. Alternatively, one or more further processing steps may be performed on the underflow stream prior to being utilized or provided as the secondary feed material. In this case, the underflow stream is indirectly provided as the secondary feed material. In the preferred embodiment, the underflow stream is directly provided as the secondary feed material, without any intermediate or intervening process steps.

Next, the process is comprised of the step of subjecting the secondary feed material to secondary froth flotation in order to recover a secondary bitumen product from the secondary feed material. The secondary bitumen product is comprised of an amount of bitumen. More particularly, the secondary bitumen product is comprised of a bitumen-rich fraction of the secondary feed material. Thus, the secondary bitumen product has a percentage by weight of bitumen greater than the percentage by weight of bitumen in the secondary feed material.

The secondary froth flotation may be comprised of any conventional or known froth flotation process, as described previously, performed on the secondary feed material. Thus, the secondary froth flotation involves the separation of the bitumen in the secondary feed material. In other words, the secondary feed material may be conducted or transported to any compatible conventional or known froth flotation apparatus capable of, and suitable for, recovering a secondary bitumen product from the secondary feed material.

Preferably, the secondary froth flotation is performed in a froth flotation cell. For instance, the step of subjecting the secondary feed material to secondary froth flotation may be comprised of subjecting the secondary feed material to secondary froth flotation in a secondary mechanical flotation cell. Thus, the secondary feed material will be concurrently aerated and mechanically agitated in order to recover the secondary bitumen product therefrom.

However, preferably, the step of subjecting the secondary feed material to secondary froth flotation is comprised of subjecting the secondary feed material to secondary froth flotation in a secondary column flotation cell. In this instance, the column flotation cell aerates the secondary feed material without mechanically agitating the secondary feed material. Rather, any disturbance of the secondary feed material within the secondary column flotation cell is primarily a result of the aeration of the secondary feed material.

The secondary feed material may be subjected to froth flotation in any compatible conventional or known column flotation cell. However, in the preferred embodiment, the secondary column flotation cell is substantially similar, or identical, to the column flotation cell described previously for subjecting the feed material to froth flotation. Thus, each of the components or elements comprising the secondary column flotation cell applies the same or similar considerations as, and are substantially similar or identical to, the components or elements of the column flotation cell described previously for subjecting the feed material to froth flotation.

Thus, the secondary column flotation cell is preferably comprised of a feed inlet for introducing the secondary feed material into the secondary column flotation cell, an aeration bubble inlet for introducing a supply of gas bubbles into the secondary column flotation cell, an underflow outlet for removing an underflow stream from the secondary column flotation cell, and an overflow outlet for removing the secondary bitumen product from the secondary column flotation cell.

Further, the secondary column flotation cell is preferably comprised of an upper end and a lower end, wherein the underflow outlet is located adjacent to the lower end of the secondary column flotation cell, wherein the overflow outlet is located adjacent to the upper end of the secondary column flotation cell, wherein the aeration bubble inlet is located between the underflow outlet and the overflow outlet, and wherein the feed inlet is located between the aeration bubble inlet and the overflow outlet.

Similarly, the step of subjecting the secondary feed material to secondary froth flotation in the secondary column flotation cell is preferably substantially similar, or identical to, the step of subjecting the feed material to froth flotation in the column flotation cell, as described previously. Accordingly, the step of subjecting the secondary feed material to secondary froth flotation in the secondary column flotation cell is preferably comprised of the following steps:
  (i) introducing the secondary feed material into the secondary column flotation cell at the feed inlet;
  (ii) introducing the supply of gas bubbles into the secondary column flotation cell at the aeration bubble inlet so that the gas bubbles rise in the secondary column flotation cell toward the overflow outlet;
  (iii) contacting the secondary feed material with the supply of gas bubbles as the gas bubbles rise in the secondary column flotation cell so that a bitumen-rich fraction of the secondary feed material is assisted in rising in the secondary column flotation cell toward the overflow outlet;
  (iv) removing the bitumen-rich fraction of the secondary feed material at the overflow outlet as the secondary bitumen product; and
  (v) removing the underflow stream from the secondary column flotation cell at the underflow outlet.

In addition, the step of subjecting the secondary feed material to secondary froth flotation in the secondary column flotation cell is preferably further comprised of the following step:
  (vi) passing the bitumen-rich fraction of the secondary feed material through an underwash zone of the secondary column flotation cell located between the feed inlet and the overflow outlet of the secondary column flotation cell as the bitumen-rich fraction rises toward the overflow outlet.

In the preferred embodiment, the step of subjecting the secondary feed material to secondary froth flotation in the secondary column flotation cell is substantially similar, or identical to, the step of subjecting the feed material to froth flotation in the column flotation cell, as described previously. Thus, the underwash zone has the same considerations and characteristics, and performs the same function, as previously described. Further, the subjecting step is preferably comprised of the same or similar processing steps, as described previously.

Accordingly, the underwash zone is preferably located between the feed inlet and the overflow outlet of the secondary column flotation cell. Thus, in the preferred embodiment, as the bitumen-rich fraction rises within the secondary column flotation cell, it passes upwardly out of the bitumen collection zone and through the underwash zone toward the overflow outlet for collection in the froth zone. Further, the underwash zone is preferably comprised of a layer of an underwash water contained in the secondary column flotation cell. The underwash water is substantially similar, or identical, to the underwater wash as utilized in the column flotation cell described previously.

Thus, the layer of the underwash water preferably has a temperature greater than the temperature of the secondary feed material in the bitumen collection zone of the secondary column flotation cell. In the preferred embodiment, the layer of the underwash water contained in the secondary column flotation cell has a temperature of between about 40 degrees Celsius and about 75 degrees Celsius. More preferably, the layer of the underwash water has a temperature of between about 60 degrees Celsius and about 70 degrees Celsius.

Finally, the step of subjecting the secondary feed material to secondary froth flotation in the secondary column flotation cell is preferably further comprised of the following step:
  (vii) introducing the underwash water into the secondary column flotation cell at an underwash inlet in the secondary column flotation cell located between the feed inlet and the overflow outlet.

Preferably, the underwash inlet of the secondary column flotation cell has the same considerations as the underwash inlet of the previously described underwash inlet for the column flotation cell. Thus, the underwash inlet of the secondary column flotation cell is preferably substantially similar, or identical, to the previous underwash inlet.

In addition, the introducing step for the secondary column flotation cell is preferably substantially similar, or identical, to the introducing step for the previously described column flotation cell. Thus, in the preferred embodiment, the underwash water which is introduced into the secondary column flotation cell has a temperature of between about 40 degrees Celsius and about 75 degrees Celsius, and more preferably, between about 60 degrees Celsius and about 70 degrees Celsius. Further, the underwash water is preferably introduced into the secondary column flotation cell under substantially laminar flow conditions in order to minimize turbulence in the secondary column flotation cell.

Where the secondary bitumen product is of a desired quality, the secondary bitumen product may be combined with the initial bitumen product recovered from the previously described column flotation cell. However, if desired, the secondary bitumen product may be combined with the initial feed material for further processing. In other words, the secondary bitumen product is re-cycled back to the first or initial froth flotation step in the column flotation cell.

Thus, the bitumen recovery process of the present invention may be further comprised of the step, following the step of subjecting the secondary feed material to secondary froth flotation in the secondary column flotation cell, of:
  (e) adding the secondary bitumen product to the feed material so that the feed material comprises the secondary bitumen product.

The feed material is therefore a combination of the bitumen froth, or a component derived therefrom, produced in the primary separation process and the recovered secondary bitumen product.

In addition, wherein the step of subjecting the secondary feed material to secondary froth flotation in the secondary column flotation cell produces a secondary underflow stream, the bitumen recovery process is preferably further comprised of the step, following the step of subjecting the secondary feed material to secondary froth flotation in the secondary column flotation cell, of:
  (e) subjecting the secondary underflow stream to thickening in a solids thickener in order to produce a thickener underflow stream and a thickener overflow stream.

The secondary underflow stream is typically comprised of small amounts of bitumen and a suspension of dispersed fines or fine mineral matter. The thickening step is comprised of de-watering the suspension of dispersed fines. Thus, the thickening step produces a thickener underflow stream comprised substantially or essentially of a sludge including fine mineral matter and solids, as well as a thickener overflow stream comprised substantially or essentially of water and some of the remaining bitumen in the secondary underflow stream.

The thickening step may be performed in any conventional or known solids thickener suitable for thickening the secondary underflow stream. As indicated, the solids thickener de-waters or concentrates the secondary underflow stream to produce a sludge. Where desired, the action of the solids thickener may be enhanced or facilitated by adding a flocculant to the secondary underflow stream either prior to or concurrently with the step of subjecting the secondary underflow stream to thickening in the solids thickener. The flocculant is provided to promote the settlement or aggregation of the dispersed fine mineral matter in the secondary underflow stream.

Further, the bitumen recovery process preferably re-cycles as much process water as possible. Thus, the thickener overflow stream, comprised of water and typically an amount of residual bitumen, is preferably recycled within the process. For instance, the water may be recycled for use in the primary separation process. However, it has been found that even a relatively small amount of bitumen in the thickener overflow stream may negatively affect the various downstream apparatuses and hinder or prejudice the performance of the process. Thus, preferably, the thickener overflow stream produced by the solids thickener is further processed to further separate the bitumen from the water contained therein.

In the preferred embodiment, the bitumen recovery process is further comprised of the steps, following the step of subjecting the secondary underflow stream to thickening in a solids thickener, of:

(f) providing the thickener overflow stream as a tertiary feed material;
(g) subjecting the tertiary feed material to tertiary froth flotation to recover a tertiary bitumen product from the tertiary feed material.

The process may further include the step of providing the thickener overflow stream as a tertiary feed material, which is then subjected to tertiary froth flotation. The thickener overflow stream from the solids thickener may be directly or indirectly provided as the tertiary feed material. In other words, the thickener overflow stream may be directly provided as and comprise the tertiary feed material. Alternatively, one or more further processing steps may be performed on the thickener overflow stream prior to being utilized or provided as the tertiary feed material. In this case, the thickener overflow stream is indirectly provided as the tertiary feed material. In the preferred embodiment, the thickener overflow stream is directly provided as the tertiary feed material, without any intermediate or intervening process steps.

Next, the process is comprised of the step of subjecting the tertiary feed material to tertiary froth flotation in order to recover a tertiary bitumen product from the tertiary feed material. The tertiary bitumen product is comprised of an amount of bitumen. More particularly, the tertiary bitumen product is comprised of a bitumen-rich fraction of the tertiary feed material. Thus, the tertiary bitumen product has a percentage by weight of bitumen greater than the percentage by weight of bitumen in the tertiary feed material.

The tertiary froth flotation may be comprised of any conventional or known froth flotation process, as described previously, performed on the tertiary feed material. Thus, the tertiary froth flotation involves the separation of the bitumen in the tertiary feed material. In other words, the tertiary feed material may be conducted or transported to any compatible conventional or known froth flotation apparatus capable of, and suitable for, recovering a tertiary bitumen product from the tertiary feed material.

Preferably, the tertiary froth flotation is performed in a froth flotation cell. For instance, the step of subjecting the tertiary feed material to tertiary froth flotation may be comprised of subjecting the tertiary feed material to tertiary froth flotation in a tertiary mechanical flotation cell. Thus, the tertiary feed material will be concurrently aerated and mechanically agitated in order to recover the tertiary bitumen product therefrom.

However, preferably, the step of subjecting the tertiary feed material to tertiary froth flotation is comprised of subjecting the tertiary feed material to tertiary froth flotation in a tertiary column flotation cell. In this instance, the column flotation cell aerates the tertiary feed material without mechanically agitating the tertiary feed material. Rather, any disturbance of the tertiary feed material within the tertiary column flotation cell is primarily a result of the aeration of the tertiary feed material.

The tertiary feed material may be subjected to froth flotation in any compatible conventional or known column flotation cell. However, in the preferred embodiment, the tertiary column flotation cell is substantially similar, or identical, to the column flotation cell described previously for subjecting the feed material to froth flotation, except as specifically noted to the contrary below. Thus, each of the components or elements comprising the tertiary column flotation cell applies the same or similar considerations as, and are substantially similar or identical to, the components or elements of the column flotation cell described previously for subjecting the feed material to froth flotation, except as specifically noted to the contrary below.

Thus, the tertiary column flotation cell is preferably comprised of a feed inlet for introducing the tertiary feed material into the tertiary column flotation cell, an aeration bubble inlet for introducing a supply of gas bubbles into the tertiary column flotation cell, an underflow outlet for removing an underflow stream from the tertiary column flotation cell, and an overflow outlet for removing the tertiary bitumen product from the tertiary column flotation cell.

Further, the tertiary column flotation cell is preferably comprised of an upper end and a lower end, wherein the underflow outlet is located adjacent to the lower end of the tertiary column flotation cell, wherein the overflow outlet is located adjacent to the upper end of the tertiary column flotation cell, wherein the aeration bubble inlet is located between the underflow outlet and the overflow outlet, and wherein the feed inlet is located between the aeration bubble inlet and the overflow outlet.

Similarly, the step of subjecting the tertiary feed material to tertiary froth flotation in the tertiary column flotation cell is preferably substantially similar, or identical to, the step of subjecting the feed material to froth flotation in the column flotation cell, as described previously, except where noted otherwise. Accordingly, the step of subjecting the tertiary feed material to tertiary froth flotation in the tertiary column flotation cell is preferably comprised of the following steps:

(i) introducing the tertiary feed material into the tertiary column flotation cell at the feed inlet;
(ii) introducing the supply of gas bubbles into the tertiary column flotation cell at the aeration bubble inlet so that the gas bubbles rise in the tertiary column flotation cell toward the overflow outlet;
(iii) contacting the tertiary feed material with the supply of gas bubbles as the gas bubbles rise in the tertiary column flotation cell so that a bitumen-rich fraction of the tertiary feed material is assisted in rising in the tertiary column flotation cell toward the overflow outlet;
(iv) removing the bitumen-rich fraction of the tertiary feed material at the overflow outlet as the tertiary bitumen product; and
(v) removing the underflow stream from the tertiary column flotation cell at the underflow outlet.

The step of subjecting the tertiary feed material to tertiary froth flotation in the tertiary column flotation cell may include the step of passing the bitumen-rich fraction through an underwash zone of the tertiary column flotation cell located between the feed inlet and the overflow outlet of the tertiary column flotation cell as the bitumen-rich fraction rises toward the overflow outlet. In this instance, the step of subjecting the tertiary feed material to tertiary froth flotation in the tertiary column flotation cell is substantially similar, or identical to, the step of subjecting the feed material to froth flotation in the column flotation cell, as described previously. For instance, the underwash zone has the same considerations and characteristics, and performs the same function, as previously described. Further, the subjecting step is preferably comprised of the same or similar processing steps, as described previously.

However, in the preferred embodiment, the step of passing the bitumen-rich fraction through an underwash zone has been found not be necessary in the tertiary froth flotation. In particular, the tertiary feed material is typically largely or substantially free of any fine mineral matter or solids. Thus, the underwash zone is typically not required for further cleaning of the tertiary feed material. However, as indicated, the underwash zone may be utilized where the composition of the tertiary feed material makes this step either desirable or necessary in order to recover the desired tertiary bitumen product.

Where the recovered tertiary bitumen product is of a desired quality, the tertiary bitumen product may be combined with the initial bitumen product recovered from the previously described column flotation cell. However, if desired, the tertiary bitumen product may be combined with the initial feed material for further processing. In other words, the tertiary bitumen product is re-cycled back to the first or initial froth flotation step in the column flotation cell.

Thus, the bitumen recovery process of the present invention may be further comprised of the step, following the step of subjecting the tertiary feed material to tertiary froth flotation in the tertiary column flotation cell, of:

(h) adding the tertiary bitumen product to the feed material so that the feed material comprises the tertiary bitumen product.

The feed material is therefore a combination of the bitumen froth, or a component derived therefrom, produced in the primary separation process and the recovered tertiary bitumen product. More particularly, in the preferred embodiment, the feed material is a combination of the bitumen froth, or a component derived therefrom, produced in the primary separation process, the recovered secondary bitumen product and the recovered tertiary bitumen product.

SUMMARY OF DRAWINGS

Embodiments of the invention will now be described with reference to the accompanying drawings, in which.

DETAILED DESCRIPTION

Figure 1:
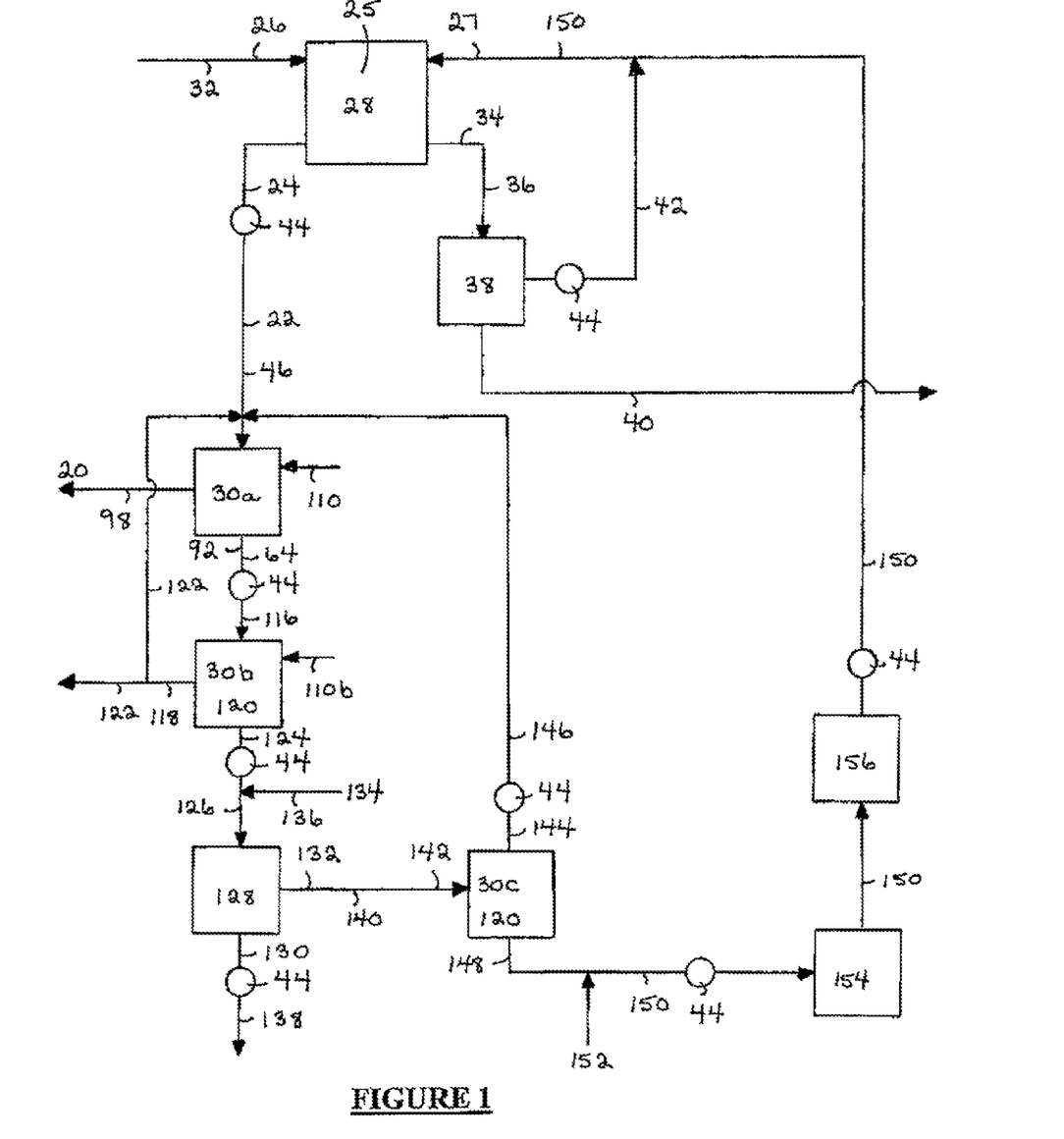
FIG. 1 is a flow chart of a preferred embodiment of the bitumen recovery process of the present invention.
Figure 2:
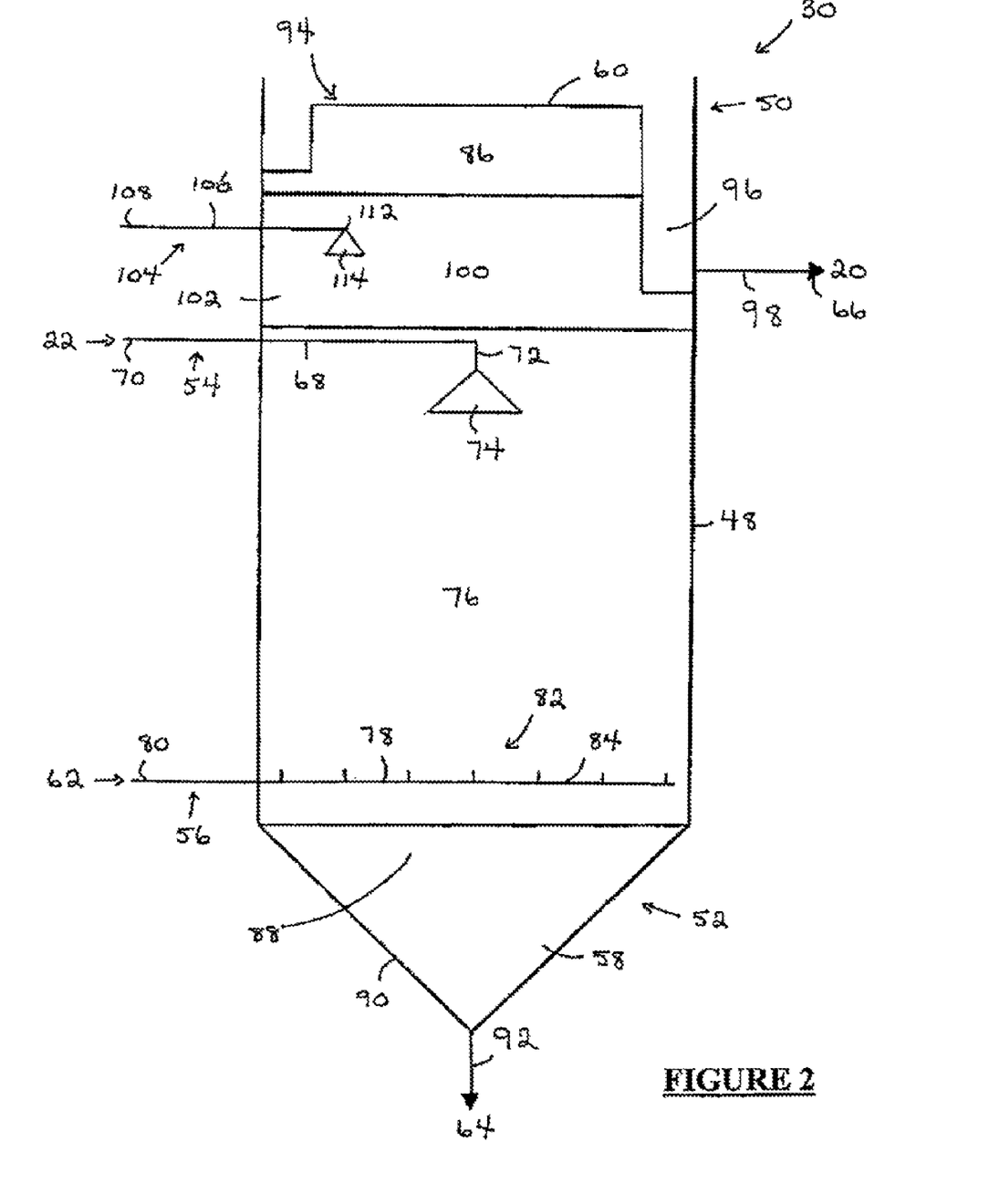
FIG. 2 is a schematic diagram of a preferred embodiment of a column flotation cell utilized in the process of FIG. 1.

Referring to FIGS. 1-2, the present invention relates to a process for recovering a bitumen product (20) from a feed material (22) comprised of a bitumen froth (24) or a component derived from the bitumen froth (24). The bitumen froth (24) is produced from a slurry (25), comprised of oil sand (26) and water (27), by a primary separation process (28). Further, the process is comprised of the step of subjecting the feed material (22) to froth flotation in a column flotation cell (30).

In the preferred embodiment, the oil sand is comprised of a matrix of bitumen, solid particles and water. The bitumen is comprised of heavy oil or viscous hydrocarbons. The solid particles are comprised of mineral matter including coarse mineral matter, such as sand and rock, and fine mineral matter such as silt and clay.

The bitumen froth (24) is produced from a slurry (25) including the particles of oil sand (26) suspended within the water (27). The slurry (25) may be formed in any conventional or known manner, and may include subjecting the oil sand (26) to thermal and/or mechanical action to disintegrate or break apart the particles of oil sand (26) prior to combining the oil sand (26) with the water (27) to produce the desired slurry (22). The water (27) may be provided from any source, but is preferably comprised of water re-cycled within the complete bitumen recovery process as described herein. Further, the slurry (25) may be formed either prior to being conducted to the primary separation process (28) or during the primary separation process (28).

For instance, the oil sand (26) and water (27) may first be combined to form the slurry (25). The slurry (25) may then be conveyed or transported to the primary separation process (28) through a suitable line, pipe or conduit to the primary separation process (28). Alternately, as shown in FIG. 1, the oil sand (26) and the water (27) are separately conveyed to the primary separation process (28) such that the oil sand (26) and the water (27) are combined to form the slurry (25) during the primary separation process (28). In this instance, the oil sand (26) is conveyed or transported by a conveyor (32), line, pipe or conduit to the primary separation process (28) for the production of the bitumen froth (24). Preferably, the conveyor (32) is comprised of a belt conveyor.

The bitumen froth (24) produced by the primary separation process (28) is preferably comprised of bitumen, water and an amount of fine mineral matter. In the preferred primary separation process (28), a solid stream (34) and a liquid stream comprised of the bitumen froth (24) are produced.

More particularly, in the preferred embodiment, based upon the assumptions that the oil sand (26) entering the primary separation process (28) is comprised of 100% of the solid particles and that an amount of water will be lost during processing, the solid stream (34) is typically comprised of between about 85-90% of the solid particles. Conversely, the liquid stream or bitumen froth (24) is typically comprised of between about 70-80% water, between about 10-15% bitumen and between about 10-15% of the solid particles.

The primary separation process (28) refers to the chief or principal separation process first or initially conducted on the slurry (25) or to which the slurry (25) is exposed which produces the bitumen froth (24). The primary separation process may be performed by any conventional separator or separation vessel capable of producing the bitumen froth (24). For instance, the primary separation process (28) may be comprised of a conventional hot water bitumen recovery process. Preferably, the primary separation process (28) is comprised of a countercurrent separation process performed in a suitable countercurrent separator or separation vessel. For example, the countercurrent separator described in Canadian Patent No. 2,123,076 may be utilized.

In any event, the solid stream (34) is removed, expelled or discharged from the primary separation process (28) through a line (36), pipe or conduit. The solid stream (34) may be removed for storage or disposal. However, preferably, the solid stream (34) is first subjected to vacuum filtering to remove any residual water from the solid particles, such that the residual water may be re-cycled back to the primary separation process (28). Referring to FIG. 1, the solid stream (34) discharged from the primary separation process (28) is conveyed or conducted through line (36) to a vacuum filter (38), which may also be referred to as a horizontal belt filter.

Although any conventional vacuum filter may be used, the vacuum filter (38) is preferably a vacuum belt filter as described in Canadian Patent No. 2,123,076. In particular, the vacuum belt filter (38) is comprised of a perforated belt which is covered by a filter media. The solid stream (34) is deposited on the covered belt and a vacuum is drawn from underneath to remove water or moisture from the solid stream (34).

The dewatered solid stream (40) is then transported for storage or disposal. The water or moisture withdrawn by the vacuum filter (38), which may be referred to as a filtrate water (42), is conducted, transported or re-cycled back for use in the primary separation process (28). One or more conventional or known pumps (44) may be provided as necessary to conduct the filtrate water (42) to the primary separation process (28).

The bitumen froth (24) or a component derived from the bitumen froth (24) is provided as the feed material (22) to be subjected to froth flotation. Referring to FIG. 1, the feed material (22) is conducted or conveyed through a line (46), pipe or conduit from the primary separation process (28) to a column flotation cell (30), particularly, a primary column flotation cell (30a). One or more conventional or known pumps (44) may be provided as necessary to conduct the feed material (22) through the line (46) to the primary column flotation cell (30a).

Preferably, as shown in FIG. 1, the bitumen froth (24) produced by the primary separation process (28) is directly provided to the primary column flotation cell (30a) as the feed material (22), without any intermediate or intervening processing steps. However, alternately, one or more further processing steps may be performed on the bitumen froth (24) to provide a component derived from the bitumen froth (24), prior to being conducted to the primary column flotation cell (30a). In this case, the component derived from the bitumen froth (24) is conducted to the primary column flotation cell (30a) as the feed material (22).

The feed material (22) is then subjected to froth flotation in the primary column flotation cell (30a) in order to recover the bitumen product (20), which is comprised of a bitumen-rich fraction of the feed material (20). Thus, the bitumen product (20) has a percentage by weight of bitumen greater than the percentage by weight of bitumen in the feed material (22). As indicated previously, the percentage by weight of bitumen in the bitumen product (20) is dependent, at least in part, upon the percentage by weight of bitumen in the feed material (22). Typically, the bitumen product (20) has a concentration by weight of between about 10 percent and 65 percent bitumen. However, in the preferred embodiment in which the bitumen froth (24) is comprised of between about 10-15 percent bitumen, the bitumen product (20) may have a concentration by weight of between about 40 percent and 65 percent bitumen.

The primary column flotation cell (30a) may be any compatible conventional or known column flotation cell having any dimensions or configuration suitable for performing the froth flotation to recover the bitumen product (20) from the feed material (22). However, in the preferred embodiment, the primary column flotation cell (30a) is comprised of the column flotation cell (30) shown in FIG. 2, as described in detail below.

Referring to FIG. 2, the column flotation cell (30) preferably has a cylindrical column body (48) defining an upper end (50) and a lower end (52) of the column flotation cell (30). The height of the column flotation cell (30) may vary, but typically ranges between about 7.5-15 meters. In the preferred embodiment, the column flotation cell (30) has a height of about 15 meters and a diameter of about 6 meters. However, the specific dimensions will be selected depending upon, amongst other factors, the characteristics of the feed material (22), the desired characteristics of the bitumen product (20) and the desired residence time of the feed material (22) in the column flotation cell (30). For example, a residence time of about 10 minutes may be desirable.

Further, the column flotation cell (30) is comprised of a feed inlet (54), an aeration bubble inlet (56), an underflow outlet (58) and an overflow outlet (60). The feed inlet (54) is provided for introducing the feed material (22) into the column flotation cell (30). The aeration bubble inlet (56) is provided for introducing a supply of gas bubbles (62) into the column flotation cell (30). The underflow outlet (58) is provided for removing an underflow stream (64) from the column flotation cell (30) for further processing. The overflow outlet (60) is provided for removing an overflow stream (66) comprising the bitumen product (20) from the column flotation cell (30).

The feed inlet (54) is preferably comprised of at least one feed conduit (68) which extends through the column body (48) in order to introduce or convey the feed material (22) therein. A first end (70) of the feed conduit (68), exterior of the column body (48), is fluidly connected with the line (46) conveying the feed material (22) from the primary separation process (28). A second end (72) of the feed conduit (68), interior of the column body (48), distributes the feed material (22) within the column flotation cell (30). Preferably, the second end (72) is comprised of a distributor head or feed distributor (74) for dispersing or scattering the feed material (22) within the column flotation cell (30) in a desired manner to enhance or facilitate the contact of the feed material (22) with the gas bubbles provided by the aeration bubble inlet (56).

The second end (72) of the feed conduit (68) is preferably positioned or located within the column flotation cell (30) between the aeration bubble inlet (56) and the overflow outlet (60). Further, the feed inlet (54), and particularly the feed conduit (68), defines an uppermost end of a bitumen collection zone (76) within the column flotation cell (30).

The aeration bubble inlet (56) is preferably comprised of at least one sparger or sparger tube (78), also referred to as an air lance. Generally speaking, the sparger tube (78) is a conduit defining a plurality of holes therein which permit the passage of the gas bubbles out of the conduit into the column flotation cell (30).

A first end (60) of the sparger tube (78), exterior of the column body (48), is fluidly connected with the supply of gas bubbles (62). Preferably, the gas bubbles are air bubbles supplied under pressure such that the pressurized air bubbles are injected into the column flotation cell (30). A relatively high gas pressure is utilized, typically about 100 psi. A second end (82) of the sparger tube (78), interior of the column body (48), distributes the gas bubbles within the column flotation cell (30). Preferably, the second end (82) is comprised of an injector portion (84) which extends across the column body (48) and is adapted for dispersing or scattering the gas bubbles within the column flotation cell (30) in a desired manner or pattern to enhance or facilitate the contact of the gas bubbles with the feed material (22) provided by the feed inlet (54).

The second end (82) of the sparger tube (78) is preferably positioned or located within the column flotation cell (30) between the underflow outlet (58) and the overflow outlet (60). More particularly, the second end (82) of the sparger tube (78) is preferably positioned or located within the column flotation cell (30) between the feed inlet (54) and the underflow outlet (58). Further, the aeration bubble inlet (56), and particularly the sparger tube (78), defines a lowermost end of the bitumen collection zone (76) within the column flotation cell (30).

Thus, in order to maximize the bitumen collection zone (76), the aeration bubble inlet (56) is preferably located in proximity to or adjacent the underflow outlet (58), while the feed inlet (54) is spaced a desired distance from the aeration bubble inlet (56) to provide the desired size, volume or dimension of the bitumen collection zone (76).

In the performance of the process, the feed material (22) passes through the feed inlet (54) and descends or travels downwardly through the bitumen collection zone (76) towards the lower end (52) of the column flotation cell (30). Concurrently, a swarm, mass or plurality of gas bubbles are generated and introduced through the aeration bubble inlet (56) which ascend or travel upwardly through the bitumen collection zone (76) towards the upper end (50) of the column flotation cell (30). Accordingly, within the bitumen collection zone (76), bitumen particles moving downwardly with the feed material (22) collide with and attach to the gas bubbles travelling upwardly. Thus, a bitumen-rich fraction of the feed material (22) is separated from the remainder of the feed material (22) and moved upwardly with the gas bubbles, eventually reaching the upper end (50) of the column flotation cell (30) to form a froth zone (86). The froth zone (86) is therefore located above the bitumen collection zone (76) in the column flotation cell (30).

As stated, the underflow outlet (58) is provided for removing the underflow stream (64) from the column flotation cell (30) for further processing. To facilitate the removal of the underflow stream (64), the underflow outlet (58) is preferably located at, in proximity to or otherwise adjacent to the lower end (52) of the column flotation cell (30), beneath or below the bitumen collection zone (76). More particularly, the underflow outlet (58) is preferably comprised of the lower end (52) of the column flotation cell (30) defining an underflow discharge opening (88) sized and proportioned to permit the underflow stream (64) to be removed therethrough. In the preferred embodiment, the underflow discharge opening (88) is particularly comprised of an underflow collector or launder (90). The underflow stream (64) is collected in the underflow launder (90) and directed into a line (92), pipe or conduit for transporting or conveying the underflow stream (64) for further processing.

The overflow outlet (60) is provided for removing the overflow stream (66) comprising the bitumen product (20) from the column flotation cell (30). As discussed, the bitumen-rich fraction of the feed material (22) attaches to the gas bubbles and moves towards the upper end (50) of the column flotation cell (30) to form the froth zone (86). The bitumen-rich fraction is then removed through the overflow outlet (60) as the bitumen product (20). Thus, to facilitate the removal of the bitumen product (20), the overflow outlet (60) is preferably located at, in proximity to or otherwise adjacent to the upper end (50) of the column flotation cell (30) and the associated froth zone (86).

More particularly, the overflow outlet (60) is preferably comprised of the upper end (50) of the column flotation cell (30) defining an overflow discharge opening (94) sized and proportioned to permit the overflow stream (66) to be removed therethrough. In the preferred embodiment, the overflow discharge opening (94) is particularly comprised of an overflow collector or launder (96). The overflow stream (66) comprising the bitumen product (20) is collected in the overflow launder (96) and directed into a line (98), pipe or conduit for transporting or conveying the bitumen product (20) away from the column flotation cell (30).

Thus, in summary, in the preferred embodiment, the feed material (22) is conducted through line (46) and introduced into the column flotation cell (30) at the feed inlet (54). In particular, the feed material (22) passes through the feed conduit (68) for distribution within the column flotation cell (30) by the feed distributor (74). Concurrently, the supply of gas bubbles (62) is introduced into the column flotation cell (30) at the aeration bubble inlet (56). In particular, the gas bubbles pass through the sparger tube (78) for distribution within the column flotation cell (30).

As a result, the gas bubbles rise in the column flotation cell (30), through the bitumen collection zone (76), toward the overflow outlet (60). The feed material (22) is thus contacted with the supply of gas bubbles (62) as the gas bubbles rise so that the bitumen-rich fraction of the feed material (22) is assisted in rising in the column flotation cell (30). The bitumen-rich fraction of the feed material (22) is then removed from the column flotation cell (30) at the overflow outlet (60) as the bitumen product (20). In particular, the bitumen-rich fraction of the feed material (22) is collected in the overflow launder (96) and conducted into line (98). Finally, the underflow stream (64) is removed from the column flotation cell (30) at the underflow outlet (58). In particular, the underflow stream (64) is collected in the underflow launder (90) and conducted into line (92).

In the preferred embodiment, the column flotation cell (30), including the primary column flotation cell (30*a*), is further comprised of an underwash zone (100) located or positioned between the bitumen collection zone (76) and the froth zone (86). Thus, the bitumen-rich fraction of the feed material (22) is passed through the underwash zone (100) as the bitumen-rich fraction rises toward the overflow outlet (60). The underwash zone (100) cleans the bitumen-rich fraction as it passes therethrough by facilitating the further separation of any undesirable fine mineral matter or other solids from the bitumen.

In the preferred embodiment, as shown in FIG. 2, the underwash zone (100) is particularly located between the feed conduit (68) of the feed inlet (54) and the overflow outlet (60). Further, the underwash zone (100) is comprised of a layer (102) of an underwash water, wherein the underwash water is preferably relatively clean or free of impurities or extraneous matter. The amount of water comprising the layer (102) will vary depending upon, amongst other factors, the amount of the feed material (22) in the column flotation cell (30). In the preferred embodiment, about 2-3 units of underwash water are provided for every 100 units of feed material (22).

As the layer (102) of the underwash water facilitates the further separation of the bitumen-rich fraction, any separated fine mineral matter or solids drop back or fall within the underwash zone (100) back towards the bitumen collection zone (76). The remainder of the bitumen-rich fraction rises within the underwash zone (100) towards the froth zone (86).

The column flotation cell (30) is preferably further comprised of an underwash inlet (104) provided for introducing the layer (102) of the underwash water into the column flotation cell (30). The underwash inlet (104) is preferably comprised of at least one underwash conduit (106) which extends through the column body (48) to introduce or convey the underwash water therein. A first end (108) of the underwash conduit (106), exterior of the column body (48), is fluidly connected with a line (110), pipe or conduit for conveying the underwash water to the column flotation cell (30).

A second end (112) of the underwash conduit (106), interior of the column body (48), distributes the underwash water within the column flotation cell (30), and particularly within the underwash zone (100). The second end (112) of the underwash conduit (106) is preferably positioned or located within the column flotation cell (30) between the feed conduit (68) comprising the feed inlet (54) and the overflow outlet (60). Preferably, the second end (112) is comprised of a distributor head or underwash water distributor (114) for introducing or distributing the underwash water in a desired manner. Preferably, the underwash water is introduced into the column flotation cell (30) under substantially laminar flow conditions in order to minimize turbulence in the underwash zone (100). Thus, in the preferred embodiment, the underwash water distributor (114) is adapted to introduce or disperse the underwash water within the column flotation cell (30) under the desired substantially laminar flow conditions.

To facilitate the action of the underwash water in the underwash zone (100), the layer (102) of the underwash water preferably has a temperature of between about 40 degrees Celsius and about 75 degrees Celsius. More preferably, the layer (102) of the underwash water has a temperature of between about 60 degrees Celsius and about 70 degrees Celsius. Accordingly, the underwash water is preferably introduced into the column flotation cell (30) at the desired temperature. To provide the underwash water at the desired temperature, a heater (not shown) may be associated with line (110).

As indicated above, following the step of subjecting the feed material (22) to froth flotation in the primary column flotation cell (30a), the underflow stream (64) from the primary column flotation cell (30a) is conducted into line (92) and conveyed for further processing. In particular, the underflow stream (64) is provided as a secondary feed material (116). In the preferred embodiment, the secondary feed material (116) is subjected to secondary froth flotation in order to recover a secondary bitumen product (118) from the secondary feed material (116). The secondary bitumen product (118) is comprised of a bitumen-rich fraction of the secondary feed material (116). Thus, the secondary bitumen product (118) has a percentage by weight of bitumen greater than the percentage by weight of bitumen in the secondary feed material (116).

Referring to FIG. 1, the secondary feed material (116) is conducted or conveyed through line (92) from the primary column flotation cell (30a) to a further froth flotation cell (120). One or more conventional or known pumps (44) may be provided as necessary to conduct the secondary feed material (116) through line (92). Preferably, as shown in FIG. 1, the underflow stream (64) is directly provided to the froth flotation cell (120) as the secondary feed material (116), without any intermediate or intervening processing steps. However, alternately, one or more further processing steps may be performed on the underflow stream (64) prior to being conducted to the froth flotation cell (120).

The froth flotation cell (120) may be comprised of a secondary mechanical flotation cell. The secondary mechanical flotation cell may be comprised of any compatible known or conventional mechanical flotation cell adapted to concurrently aerate and mechanically agitate the secondary feed material (116) in order to recover the bitumen product (118) therefrom. However, the froth flotation cell (120) is preferably a secondary column flotation cell (30b) such that the secondary feed material (116) is aerated without any mechanical agitation.

Thus, in the preferred embodiment, the secondary feed material (116) is subjected to secondary froth flotation in the secondary column flotation cell (30b) in order to recover the secondary bitumen product (118), which is comprised of a bitumen-rich fraction of the secondary feed material (116). The secondary column flotation cell (30b) may be any compatible conventional or known column flotation cell having any dimensions or configuration suitable for performing the secondary froth flotation to recover the secondary bitumen product (118) from the secondary feed material (116). However, in the preferred embodiment, the secondary column flotation cell (30b) is comprised of the column flotation cell (30) shown in FIG. 2, as described in detail above.

Thus, in summary, in the preferred embodiment, the secondary feed material (116) is conducted through line (92) and introduced into the secondary column flotation cell (30b), comprised of the column flotation cell (30) described previously, at the feed inlet (54). In particular, the secondary feed material (116) passes through the feed conduit (68) for distribution within the secondary column flotation cell (30b) by the feed distributor (74). Concurrently, the supply of gas bubbles (62) is introduced into the secondary column flotation cell (30b) at the aeration bubble inlet (56). In particular, the gas bubbles pass through the sparger tube (78) for distribution within the secondary column flotation cell (30b).

As a result, the gas bubbles rise in the secondary column flotation cell (30b), through the bitumen collection zone (76), toward the overflow outlet (60). The secondary feed material (116) is thus contacted with the supply of gas bubbles (62) as the gas bubbles rise so that the bitumen-rich fraction of the secondary feed material (116) is assisted in rising in the secondary column flotation cell (30b). The bitumen-rich fraction of the secondary feed material (116) is then removed from the secondary column flotation cell (30b) at the overflow outlet (60) as the secondary bitumen product (118). In particular, the bitumen-rich fraction of the secondary feed material (116) is collected in the overflow launder (96) and conducted into a line (122), pipe or conduit for transporting or conveying the secondary bitumen product (118) away from the secondary column flotation cell (30b). Finally, the underflow stream (64), particularly referred to as the secondary underflow stream (124), is removed from the secondary column flotation cell (30b) at the underflow outlet (58). In particular, the underflow stream (64) is collected as the secondary underflow stream (124) in the underflow launder (90) and conducted into a line (126), pipe or conduit for transporting or conveying the secondary underflow stream (124) for further processing.

Further, the bitumen-rich fraction of the secondary feed material (116) is passed through the underwash zone (100) of the secondary column flotation cell (30b) as the bitumen-rich fraction rises toward the overflow outlet (60). Specifically, the layer (102) of the underwash water comprising the underwash zone (100) cleans the bitumen-rich fraction as it passes therethrough by facilitating the further separation of any undesirable fine mineral matter or other solids from the bitumen.

The underwash inlet (104), and preferably the underwash conduit (106), introduces the layer (102) of the underwash water into the secondary column flotation cell (30b). The first end (108) of the underwash conduit (106) is fluidly connected with a line (110b), pipe or conduit for conveying the underwash water to the secondary column flotation cell (30b). The second end (112) of the underwash conduit (106), and particularly the underwash water distributor (114), introduces and distributes the underwash water within the underwash zone (100) of the secondary column flotation cell (30b) under substantially laminar flow conditions in order to minimize turbulence in the underwash zone (100). Further, the underwash water is preferably introduced into the secondary column flotation cell (30b) and maintained in the underwash zone (100) at a temperature of between about 40 degrees Celsius and about 75 degrees Celsius, and more preferably, between about 60 degrees Celsius and about 70 degrees Celsius.

Where the secondary bitumen product (118) is of a desired quality, the secondary bitumen product (118) may be conveyed through line (122) for combination with the bitumen product (20) recovered from the primary column flotation cell (30*a*). However, preferably the secondary bitumen product (118) is conveyed through line (122) for combination with the feed material (22). In particular, the secondary bitumen product (118) is added or combined with the feed material (22) in line (46) for further processing in the primary column flotation cell (30*a*).

Further, in the preferred embodiment, the secondary underflow stream (124) produced by the secondary column flotation cell (30*b*) is subsequently subjected to thickening in a solids thickener (128) in order to produce a thickener underflow stream (130) and a thickener overflow stream (132). Referring to FIG. 1, the secondary underflow stream (124) is conducted or conveyed through line (126) from the secondary column flotation cell (30*b*) to the solids thickener (128). One or more conventional or known pumps (44) may be provided as necessary to conduct the secondary underflow stream (124) through line (126).

The secondary underflow stream (124) is primarily comprised of a suspension of dispersed fine mineral matter, but also typically contains a relatively small amount of bitumen. Thus, the solids thickener (128) is provided to thicken the secondary underflow stream (124) by de-watering the suspension of dispersed fines. As a result, as indicated, the thickening step produces the thickener underflow stream (130) comprised substantially or essentially of a sludge including fine mineral matter and solids. In addition, the thickening step produces the thickener overflow stream (132) comprised substantially or essentially of water and some of the remaining bitumen in the secondary underflow stream (124).

The solids thickener (128) may be comprised of any conventional or known solids thicker suitable for thickening the secondary underflow stream (124) by de-watering or concentrating the secondary underflow stream (124). Further, in order to enhance or facilitate the action of the solids thickener (128), a flocculant (134) may be added to the secondary underflow stream (124). Any compatible conventional or known flocculant (134) may be used which is capable of promoting the settlement of the dispersed fine mineral matter in the secondary underflow stream (124) or facilitating or promoting the aggregation of any fine mineral matter or fine solid particles comprising the he secondary underflow stream (124). In the preferred embodiment, the flocculant (134) is conducted through a line (136), pipe or conduit for adding to the secondary underflow stream (124) in line (126), prior to introducing the secondary underflow stream (124) to the solids thickener (128).

Subsequent to the thickening step, the thickener underflow stream (130) is preferably removed or discharged from the solids thickener (128) through a line (138), pipe or conduit which transports the thickener underflow stream (130) for storage or disposal. One or more conventional or known pumps (44) may be provided as necessary to conduct the thickener underflow stream (130) through line (138).

Further, the thickener overflow stream (132) is also preferably removed or discharged from the solids thickener (128) through a line (140), pipe or conduit which conducts or conveys the thickener overflow stream (132) for further processing. Preferably, the thickener overflow stream (132) is further processed in order to separate any remaining bitumen from the water contained in the thickener overflow stream (132).

Thus, following the step of subjecting the secondary underflow stream (124) to thickening in the solids thickener (128), the thickener overflow stream (132) is conducted into line (140) and conveyed for further processing as a tertiary feed material (142). In the preferred embodiment, the tertiary feed material (142) is subjected to tertiary froth flotation in order to recover a tertiary bitumen product (144) from the tertiary feed material (142). The tertiary bitumen product (144) is preferably comprised of a bitumen-rich fraction of the tertiary feed material (142). Thus, the tertiary bitumen product (144) has a percentage by weight of bitumen greater than the percentage by weight of bitumen in the tertiary feed material (142).

Referring to FIG. 1, the tertiary feed material (142) is conducted or conveyed through line (140) from the solids thickener (128) to a further froth flotation cell (120). One or more conventional or known pumps (44) may be provided as necessary to conduct the tertiary feed material (142) through line (140). Preferably, as shown in FIG. 1, the thickener overflow stream (132) is directly provided to the froth flotation cell (120) as the tertiary feed material (142), without any intermediate or intervening processing steps. However, alternately, one or more further processing steps may be performed on the thickener overflow stream (132) prior to being conducted to the froth flotation cell (120).

The froth flotation cell (120) utilized for the tertiary froth flotation may be comprised of a tertiary mechanical flotation cell. The tertiary mechanical flotation cell may be comprised of any compatible known or conventional mechanical flotation cell adapted to concurrently aerate and mechanically agitate the tertiary feed material (142) in order to recover the tertiary bitumen product (144) therefrom. However, the froth flotation cell (120) is preferably a tertiary column flotation cell (30*c*) such that the tertiary feed material (142) is aerated without any mechanical agitation.

Thus, in the preferred embodiment, the tertiary feed material (142) is subjected to tertiary froth flotation in the tertiary column flotation cell (30*c*) in order to recover the tertiary bitumen product (144), which is comprised of a bitumen-rich fraction of the tertiary feed material (142). The tertiary column flotation cell (30*c*) may be any compatible conventional or known column flotation cell having any dimensions or configuration suitable for performing the tertiary froth flotation to recover the tertiary bitumen product (144) from the tertiary feed material (142). However, in the preferred embodiment, the tertiary column flotation cell (30*c*) is comprised of the column flotation cell (30) shown in FIG. 2, as described in detail above, except as specifically noted otherwise below.

Thus, in summary, in the preferred embodiment, the tertiary feed material (142) is conducted through line (140) and introduced into the tertiary column flotation cell (30*c*), comprised of the column flotation cell (30) described previously, at the feed inlet (54). In particular, the tertiary feed material (142) passes through the feed conduit (68) for distribution within the tertiary column flotation cell (30*c*) by the feed distributor (74). Concurrently, the supply of gas bubbles (62) is introduced into the tertiary column flotation cell (30*c*) at the aeration bubble inlet (56). In particular, the gas bubbles pass through the sparger tube (78) for distribution within the tertiary column flotation cell (30*c*).

As a result, the gas bubbles rise in the tertiary column flotation cell (30*c*), through the bitumen collection zone (76), toward the overflow outlet (60). The tertiary feed material (142) is thus contacted with the supply of gas bubbles (62) as the gas bubbles rise so that the bitumen-rich fraction of the tertiary feed material (142) is assisted in rising in the tertiary column flotation cell (30*c*). The bitumen-rich fraction of the tertiary feed material (142) is then removed from the tertiary column flotation cell (30c) at the overflow outlet (60) as the tertiary bitumen product (144). In particular, the bitumen-rich fraction of the tertiary feed material (142) is collected in the overflow launder (96) and conducted into a line (146), pipe or conduit for transporting or conveying the tertiary bitumen product (144) away from the tertiary column flotation cell (30c). Finally, the underflow stream (64), particularly referred to as the tertiary underflow stream (148), is removed from the tertiary column flotation cell (30c) at the underflow outlet (58). In particular, the underflow stream (64) is collected as the tertiary underflow stream (148) in the underflow launder (90) and conducted into a line (150), pipe or conduit for transporting or conveying the tertiary underflow stream (148) for re-cycling to the primary separation process (28).

In the preferred embodiment, the tertiary column flotation cell (30c) is not comprised of the underwash zone (100) as described previously in relation to the column flotation cell (30). It is believed that the step of passing the bitumen-rich fraction of the tertiary feed material (142) through an underwash zone (100) is largely unnecessary as the tertiary feed material (142) is typically largely or substantially free of any fine mineral matter or solids. Accordingly, there is typically no need for further cleaning of the tertiary feed material (142).

Where the tertiary bitumen product (144) is of a desired quality, the tertiary bitumen product (144) may be conveyed through line (146) for combination with the bitumen product (20) recovered from the primary column flotation cell (30a). However, preferably the tertiary bitumen product (144) is conveyed through line (146) for combination with the feed material (22). In particular, the tertiary bitumen product (144) is added or combined with the feed material (22), and preferably the secondary bitumen product (118), in line (46) for further processing in the primary column flotation cell (30a). One or more conventional or known pumps (44) may be provided as necessary to conduct the tertiary bitumen product (144) through line (146).

The tertiary underflow stream (148) is comprised substantially or essentially of a relatively clean water, free from any residual bitumen or fine mineral matter. Thus, the tertiary underflow stream (148) is preferably conducted, transported or re-cycled back through line (150) for use in the primary separation process (28), or otherwise disposed of. One or more conventional or known pumps (44) may be provided as necessary to conduct the tertiary underflow stream (148) through the line (150).

As the tertiary underflow stream (148) is preferably re-cycled for use in the primary separation process (28), an amount of make-up or additional water (152) may be added to line (150) in order to provide the desired or required total amount of water for the performance of the primary separation process (28). As well, a heater (154) or heating apparatus may be associated with line (150) such that the re-cycled water may be heated to a desired or required temperature for use in the primary separation process (28). Any conventional or know water heater may be used. Preferably, the heater (154) heats the water utilizing steam or natural gas. Further, where necessary or desired, a conventional or known surge tank (156) may also be associated with line (150) for removing carbon dioxide from the re-cycled water. Additionally, any number of various chemicals or substances may be added to the re-cycled water in line (150) which are either desired or required for performance of the primary separation process (28).

Finally, in this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The embodiments of the invention in which an exclusive property or privilege is claimed are defined as follows:

1. A bitumen recovery process comprising the following steps:
    (a) providing a bitumen froth or a component derived from the bitumen froth as a feed material, wherein the bitumen froth is produced in a primary separation process from a slurry comprising oil sand and water; and
    (b) subjecting the feed material to froth flotation in a column flotation cell in order to recover a bitumen product from the feed material, wherein the column flotation cell is comprised of an upper end and a lower end, a feed inlet for introducing the feed material into the column flotation cell, an aeration bubble inlet for introducing a supply of gas bubbles into the column flotation cell, an underflow outlet for removing an underflow stream from the column flotation cell, and an overflow outlet for removing the bitumen product from the column flotation cell, wherein the underflow outlet is located adjacent to the lower end of the column flotation cell, wherein the overflow outlet is located adjacent to the upper end of the column flotation cell, wherein the aeration bubble inlet is located between the underflow outlet and the overflow outlet, wherein the feed inlet is located between the aeration bubble inlet and the overflow outlet, and wherein subjecting the feed material to froth flotation in the column flotation cell is comprised of:
        (i) introducing the feed material into the column flotation cell at the feed inlet;
        (ii) introducing the supply of gas bubbles into the column flotation cell at the aeration bubble inlet so that the gas bubbles rise in the column flotation cell toward the overflow outlet;
        (iii) contacting the feed material with the supply of gas bubbles as the gas bubbles rise in the column flotation cell so that a bitumen-rich fraction of the feed material is assisted in rising in the column flotation cell toward the overflow outlet;
        (iv) passing the bitumen-rich fraction of the feed material through an underwash zone of the column flotation cell located between the feed inlet and the overflow outlet of the column flotation cell as the bitumen-rich fraction rises toward the overflow outlet, wherein the underwash zone is comprised of a layer of an underwash water contained in the column flotation cell;
        (v) removing the bitumen-rich fraction of the feed material from the column flotation cell at the overflow outlet as the bitumen product; and
        (vi) removing the underflow stream from the column flotation cell at the underflow outlet.

2. The process as claimed in claim 1 wherein the layer of the underwash water contained in the column flotation cell has a temperature of between about 40 degrees Celsius and about 75 degrees Celsius.

3. The process as claimed in claim 1 wherein the step of subjecting the feed material to froth flotation in the column flotation cell is further comprised of the following step:
    (vii) introducing the underwash water into the column flotation cell at an underwash inlet in the column flotation cell located between the feed inlet and the overflow outlet.

4. The process as claimed in claim 3 wherein the underwash water which is introduced into the column flotation cell has a temperature of between about 40 degrees Celsius and about 75 degrees Celsius.

5. The process as claimed in claim 3 wherein the underwash water is introduced into the column flotation cell under substantially laminar flow conditions in order to minimize turbulence in the column flotation cell.

6. The process as claimed in claim 1 wherein the feed material consists essentially of the bitumen froth.

7. A bitumen recovery process comprising the following steps:
   (a) providing a bitumen froth or a component derived from the bitumen froth as a feed material, wherein the bitumen froth is produced in a primary separation process from a slurry comprising oil sand and water;
   (b) subjecting the feed material to froth flotation in a column flotation cell in order to recover a bitumen product from the feed material;
   (c) providing an underflow stream from the column flotation cell as a secondary feed material; and
   (d) subjecting the secondary feed material to secondary froth flotation in a secondary column flotation cell in order to recover a secondary bitumen product from the secondary feed material, wherein the secondary column flotation cell is comprised of an upper end and a lower end, a feed inlet for introducing the secondary feed material into the secondary column flotation cell, an aeration bubble inlet for introducing a supply of gas bubbles into the secondary column flotation cell, an underflow outlet for removing an underflow stream from the secondary column flotation cell, and an overflow outlet for removing the secondary bitumen product from the secondary column flotation cell, wherein the underflow outlet is located adjacent to the lower end of the secondary column flotation cell, wherein the overflow outlet is located adjacent to the upper end of the secondary column flotation cell, wherein the aeration bubble inlet is located between the underflow outlet and the overflow outlet, wherein the feed inlet is located between the aeration bubble inlet and the overflow outlet, and wherein subjecting the secondary feed material to secondary froth flotation in the secondary column flotation cell is comprised of:
      (i) introducing the secondary feed material into the secondary column flotation cell at the feed inlet;
      (ii) introducing the supply of gas bubbles into the secondary column flotation cell at the aeration bubble inlet so that the gas bubbles rise in the secondary column flotation cell toward the overflow outlet;
      (iii) contacting the secondary feed material with the supply of gas bubbles as the gas bubbles rise in the secondary column flotation cell so that a bitumen-rich fraction of the secondary feed material is assisted in rising in the secondary column flotation cell toward the overflow outlet;
      (iv) passing the bitumen-rich fraction of the secondary feed material through an underwash zone of the secondary column flotation cell located between the feed inlet and the overflow outlet of the secondary column flotation cell as the bitumen-rich fraction rises toward the overflow outlet, wherein the underwash zone is comprised of a layer of an underwash water contained in the secondary column flotation cell;
      (v) removing the bitumen-rich fraction of the secondary feed material at the overflow outlet as the secondary bitumen product; and
      (vi) removing the underflow stream from the secondary column flotation cell at the underflow outlet.

8. The process as claimed in claim 7 wherein the layer of the underwash water contained in the secondary column flotation cell has a temperature of between about 40 degrees Celsius and about 75 degrees Celsius.

9. The process as claimed in claim 7 wherein the step of subjecting the secondary feed material to secondary froth flotation in the secondary column flotation cell is further comprised of the following step:
   (vii) introducing the underwash water into the secondary column flotation cell at an underwash inlet in the secondary column flotation cell located between the feed inlet and the overflow outlet.

10. The process as claimed in claim 9 wherein the underwash water which is introduced into the secondary column flotation cell has a temperature of between about 40 degrees Celsius and about 75 degrees Celsius.

11. The process as claimed in claim 9 wherein the underwash water is introduced into the secondary column flotation cell under substantially laminar flow conditions in order to minimize turbulence in the secondary column flotation cell.

12. The process as claimed in claim 7 further comprising the step, following the step of subjecting the secondary feed material to secondary froth flotation in the secondary column flotation cell, of:
   (e) adding the secondary bitumen product to the feed material so that the feed material comprises the secondary bitumen product.

13. The process as claimed in claim 7 wherein the step of subjecting the secondary feed material to secondary froth flotation in the secondary column flotation cell produces a secondary underflow stream, further comprising the step, following the step of subjecting the secondary feed material to secondary froth flotation in the secondary column flotation cell, of:
   (e) subjecting the secondary underflow stream to thickening in a solids thickener in order to produce a thickener underflow stream and a thickener overflow stream.

14. The process as claimed in claim 13, further comprising the steps, following the step of subjecting the secondary underflow stream to thickening in a solids thickener, of:
   (f) providing the thickener overflow stream as a tertiary feed material;
   (g) subjecting the tertiary feed material to tertiary froth flotation to recover a tertiary bitumen product from the tertiary feed material.

15. The process as claimed in claim 14 wherein the step of subjecting the tertiary feed material to tertiary froth flotation is comprised of subjecting the tertiary feed material to tertiary froth flotation in a tertiary mechanical flotation cell.

16. The process as claimed in claim 14 wherein the step of subjecting the tertiary feed material to tertiary froth flotation is comprised of subjecting the tertiary feed material to tertiary froth flotation in a tertiary column flotation cell.

17. The process as claimed in claim 16 wherein the tertiary column flotation cell is comprised of a feed inlet for introducing the tertiary feed material into the tertiary column flotation cell, an aeration bubble inlet for introducing a supply of gas bubbles into the tertiary column flotation cell, an underflow outlet for removing an underflow stream from the tertiary column flotation cell, and an overflow outlet for removing the tertiary bitumen product from the tertiary column flotation cell.

18. The process as claimed in claim 17 wherein the tertiary column flotation cell is comprised of an upper end and a lower end, wherein the underflow outlet is located adjacent to the lower end of the tertiary column flotation cell, wherein the overflow outlet is located adjacent to the upper end of the tertiary column flotation cell, wherein the aeration bubble inlet is located between the underflow outlet and the overflow outlet, and wherein the feed inlet is located between the aeration bubble inlet and the overflow outlet.

19. The process as claimed in claim 18 wherein the step of subjecting the tertiary feed material to tertiary froth flotation in the tertiary column flotation cell is comprised of the following steps:
   (i) introducing the tertiary feed material into the tertiary column flotation cell at the feed inlet;
   (ii) introducing the supply of gas bubbles into the tertiary column flotation cell at the aeration bubble inlet so that the gas bubbles rise in the tertiary column flotation cell toward the overflow outlet;
   (iii) contacting the tertiary feed material with the supply of gas bubbles as the gas bubbles rise in the tertiary column flotation cell so that a bitumen-rich fraction of the tertiary feed material is assisted in rising in the tertiary column flotation cell toward the overflow outlet;
   (iv) removing the bitumen-rich fraction of the tertiary feed material at the overflow outlet as the tertiary bitumen product; and
   (v) removing the underflow stream from the tertiary column flotation cell at the underflow outlet.

20. The process as claimed in claim 16, further comprising the step, following the step of subjecting the tertiary feed material to tertiary froth flotation in the tertiary column flotation cell, of:
   (h) adding the tertiary bitumen product to the feed material so that the feed material comprises the tertiary bitumen product.

* * * * *